US009134041B2

(12) United States Patent
Zhadanovsky

(10) Patent No.: US 9,134,041 B2
(45) Date of Patent: Sep. 15, 2015

(54) VAPOR VACUUM CONDENSING BOILER DESIGNS

(71) Applicant: American Pioneer Ventures Ltd., New York, NY (US)

(72) Inventor: Igor Zhadanovsky, West Newton, MA (US)

( * ) Notice: Subject to any disclaimer, the term of this patent is extended or adjusted under 35 U.S.C. 154(b) by 34 days.

(21) Appl. No.: 14/256,978

(22) Filed: Apr. 20, 2014

(65) Prior Publication Data

US 2014/0217191 A1   Aug. 7, 2014

Related U.S. Application Data

(63) Continuation of application No. 14/025,292, filed on Sep. 12, 2013, now Pat. No. 8,702,013.

(60) Provisional application No. 61/702,533, filed on Sep. 18, 2012.

(51) Int. Cl.
*F24D 1/00* (2006.01)
*F24H 8/00* (2006.01)
(Continued)

(52) U.S. Cl.
CPC  *F24H 8/00* (2013.01); *F01K 17/02* (2013.01); *F22B 35/005* (2013.01); *F24D 1/00* (2013.01);
(Continued)

(58) Field of Classification Search
CPC ......... F24H 8/00; F24H 1/0009; F01K 17/02; F24D 1/08; F24D 1/00; F24D 1/02; F24D 19/1003; F24D 2220/0264; F22B 35/005; Y02B 30/16; Y02E 20/14
USPC ...... 237/67, 12, 9 R, 8 B, 73; 122/18.1, 18.3, 122/32
See application file for complete search history.

(56) References Cited

U.S. PATENT DOCUMENTS 1,183,853 A * 5/1916 Callaway ......................... 237/67
1,745,822 A * 2/1930 Wylie et al. ..................... 237/67
(Continued)

FOREIGN PATENT DOCUMENTS

JP          54111002 A  *  8/1979  ............... F28B 9/10
WO      WO2009117296 A3    3/2009
WO      WO2012093310 A2    7/2012

OTHER PUBLICATIONS

"Trane Vapor System," Everything2.com, Retrieved Oct. 23, 2013, Available at: http://everything2.com/title/Trane+Vapor+System.
(Continued)

*Primary Examiner* — Gregory Huson
*Assistant Examiner* — Daniel E Namay
(74) *Attorney, Agent, or Firm* — American Patent Agency PC; Daniar Hussain; Karl P. Dresdner, Jr.

(57) ABSTRACT

One embodiment of the present invention is a boiler for boiling water to produce steam, having (1) an evaporating section comprising (a) a combustion chamber for burning fuel with air and generating hot flue gas, (b) an evaporating heat exchanger around the combustion chamber for exchanging heat between the flue gas and water to produce the steam which exits the boiler; and (2) a condensing section comprising (c) a condensing heat exchanger for exchanging heat between the hot flue gas from the combustion chamber and a low-temperature water return having a temperature below approximately 100° F., generating flue gas condensate, which leaves the boiler, wherein the low-temperature water return is heated by the hot flue gas in the condensing heat exchanger before entering the evaporating heat exchanger for additional heating. The disclosed vacuum condensing boilers make vapor vacuum steam more efficient and economical for industrial, commercial, and home applications.

9 Claims, 4 Drawing Sheets

(51) Int. Cl.
*F24D 19/10* (2006.01)
*F24D 1/02* (2006.01)
*F22B 35/00* (2006.01)
*F24D 1/08* (2006.01)
*F24H 1/00* (2006.01)
*F01K 17/02* (2006.01)

(52) U.S. Cl.
CPC .. *F24D 1/02* (2013.01); *F24D 1/08* (2013.01); *F24D 19/1003* (2013.01); *F24H 1/0009* (2013.01); *F24D 2220/0264* (2013.01); *Y02B 30/16* (2013.01); *Y02E 20/14* (2013.01)

(56) References Cited

U.S. PATENT DOCUMENTS

| | | | | |
|---|---|---|---|---|
| 1,845,023 | A * | 2/1932 | Jennings | 237/67 |
| 1,968,834 | A | 8/1934 | Jones | |
| 2,004,226 | A | 6/1935 | Stickle | |
| 2,008,098 | A * | 7/1935 | Field | 122/32 |
| 2,072,887 | A * | 3/1937 | Kerr | 122/250 R |
| 2,515,647 | A * | 7/1950 | Hunt et al. | 237/9 R |
| 2,515,648 | A * | 7/1950 | Hunt et al. | 237/9 R |
| RE26,987 | E * | 11/1970 | Gatza | 237/67 |
| 4,090,557 | A | 5/1978 | Currier | |
| 4,220,194 | A * | 9/1980 | Shade et al. | 165/113 |
| 4,274,256 | A * | 6/1981 | Kalt et al. | 60/39.182 |
| 4,297,841 | A * | 11/1981 | Cheng | 60/39.3 |
| 4,344,568 | A * | 8/1982 | Stewart et al. | 237/8 R |
| 4,398,663 | A * | 8/1983 | Hegberg | 237/9 R |
| 4,998,508 | A * | 3/1991 | Stead | 122/4 D |
| 5,307,802 | A | 5/1994 | Placek | 126/600 |
| 5,839,270 | A * | 11/1998 | Jirnov et al. | 60/775 |
| 6,907,846 | B2 * | 6/2005 | Hur et al. | 122/32 |
| 6,981,651 | B2 * | 1/2006 | Robertson | 237/19 |
| 7,958,852 | B2 * | 6/2011 | Kim | 122/1 B |
| 8,702,013 | B2 * | 4/2014 | Zhadanovsky | 237/74 |
| 9,027,846 | B2 * | 5/2015 | Zhadanovsky | 237/7 |
| 2002/0074106 | A1 * | 6/2002 | van der Veen | 165/104.11 |
| 2003/0213854 | A1 * | 11/2003 | Stickford et al. | 237/12.1 |
| 2004/0256476 | A1 * | 12/2004 | Robertson | 237/2 A |
| 2008/0006226 | A1 * | 1/2008 | Takeda et al. | 122/18.1 |
| 2008/0173723 | A1 | 7/2008 | Zhadanovsky | |
| 2010/0045470 | A1 * | 2/2010 | Araiza et al. | 340/603 |
| 2010/0187320 | A1 * | 7/2010 | Southwick | 237/19 |
| 2011/0198406 | A1 | 8/2011 | Zhadanovsky | |
| 2012/0234264 | A1 * | 9/2012 | Benz | 123/3 |
| 2013/0319348 | A1 * | 12/2013 | Hughes et al. | 122/18.2 |
| 2014/0030112 | A1 * | 1/2014 | Klein et al. | 417/32 |
| 2014/0034743 | A1 | 2/2014 | Zhadanovsky | |
| 2015/0076241 | A1 * | 3/2015 | Zhadanovsky | 237/9 R |

OTHER PUBLICATIONS

"TLV Vacuumizer: Vacuum steam heating and cooling system," TLV International, Inc. corporate brochure, Retrieved Oct. 23, 2013, Available at: http://www.tlv.com/global_pdf/tii/e-pamphlet-04-hp.pdf.

Holohan, Dan, "The Lost Art of Steam Heating," pp. 242-253, 259-267, Dan Holohan Associates, Beth Page, NC, 2002. (ISBN 0-9743960-9-5) [With personal handwritten notes which are not prior art.].

Freeman, Rob, Jr., "ITC Steam Temperature Control System," Johnson Controls Inc., Nov. 8, 2009, Available at: http://www.green-buildings.com/content/781087-itc-steam-temperature-control-system.

Zhadanovsky, Igor, "Vapor Heating System with Naturally Induced Vacuum (VHSNIV)," IDEA Conference, Indianapolis, IN, Jun. 13-16, 2010.

Zhadanovsky, Igor, "Steam Heating System Upgrade to Vapor Heating System with Naturally Induced Vacuum (VHSNIV)," ASHRAE Transactions, vol. 117, Part 2, Montreal, QC, Jul. 1, 2011.

Zhadanovsky, Igor, "Vapor Vacuum Heating Technology," CIBSE ASHRAE Technical Symposium, Imperial College, London, UK, Apr. 18-19, 2012.

Zhadanovsky, Igor, "Scrutinizing Condensing Boilers With the Second Law of Thermodynamics (SLT)," Blog posted May 29, 2013, Retrieved Oct. 23, 2013, Available at: http://homeenergypros.lbl.gov/profiles/blogs/scrutinizing-condensing-boilers-with-the-second-law-of.

* cited by examiner

VAPOR VACUUM CONDENSING BOILER DESIGNS

REFERENCE TO RELATED APPLICATIONS

This application is a continuation of and claims priority from U.S. Ser. No. 14/025,292, filed on Sep. 12, 2013, entitled "VAPOR VACUUM HEATING SYSTEMS AND INTEGRATION WITH CONDENSING VACUUM BOILERS," issued on Apr. 22, 2014 as U.S. Pat. No. 8,702,313, which itself is a non-provisional of and claims the benefit of U.S. Ser. No. 61/702,533, filed on Sep. 18, 2012, entitled "Condensing boiler and vapor vacuum heating system combo," the entireties of both of which are incorporated by reference herein.

FIELD OF THE INVENTION

The present invention relates to vapor vacuum condensing boilers and their designs for use with vapor vacuum heating systems.

BACKGROUND OF THE INVENTION

The statements in this section merely provide background information related to the present disclosure and may not constitute prior art.

Existing positive low-pressure steam heating systems provide simple and reliable techniques for heating in a wide variety of industrial, commercial, and residential applications. Water (as a liquid) heated in a boiler becomes steam (a gas), which then rises through the feeder pipes (conduits) and condenses in radiators, giving off its latent heat. Radiators become hot and heat up objects in the room directly as well as the surrounding air. Steam is traditionally delivered under a low pressure of up to 2 psig at 218° F. in order to improve boiler safety and efficiency. Additionally, steam at lower pressure moves faster, contains less water, and doesn't create boiler low water problems. The boiler creates the initial steam pressure to overcome friction in the feeder pipes.

An existing steam system can be converted to a vapor (steam) vacuum system by operating the steam system under 5-10 inches of Hg vacuum. Although there are some efficiency gains, the conversion of a steam system into a vacuum system results in an increased maintenance cost due to additional vacuum equipment, condensate pumps, and electricity usage. In existing vacuum systems, steam traps are utilized in which condensate is separated from steam, sucked by a vacuum pump, and returned into the system by a water pump. Steam trap usage is also a major maintenance, repair, and replacement problem. Few new vacuum systems have been installed in the last fifty years due to high installation and maintenance costs.

Existing steam (vapor) systems are robust and reliable but have multiple problems, including high installation costs, noise, uneven heat distribution, and control difficulties. Therefore, many worn out steam systems are being retrofitted into hot water heating systems. However, such retrofits are very expensive because the boiler and the old plumbing have to be replaced which requires significant demolition of building internals. Alternatively, the level of building destruction is much less for conversion of a steam into a vacuum system. Therefore, a low-cost and efficient vacuum system would be an advantageous alternative for steam system retrofits as well as for new heating system installations.

In order to boost energy efficiency, modern hot water condensing boilers absorb the latent heat of water vapor from the flue gas. The recommended temperature of the water return (supply into boiler condensing section) is below 100° F. in order to condense most of the water from the flue gas. In reality, this temperature is at 140° F. or above for most of the heating season in order to deliver enough heat into the building. As a result, benefits of condensing mode usage are lost. Another problem of hot water condensing boilers is limited temperature of supply water. The typical temperature drop through a hot water heating system is 20° F., and therefore for condensing boilers, supply water temperature is limited to 120-160° F. At such low temperatures, the energy value of delivered heat is less than in a regular hot water system. This results in hot water condensing boilers that operate as traditional boilers with their condensing section inefficient for most of their operating time, eliminating the energy saving benefits of condensing boilers almost entirely while still having their high capital costs.

The temperature of condensate return in existing vacuum systems is either equal to the temperature of vapor rising through the same pipe or slightly lower in two pipe systems. The high temperature of condensate return is considered an inherent feature of the system and never challenged. Steam and vacuum systems are never used with condensing boilers, and therefore no steam or vacuum condensing boilers exist. Accordingly, as recognized by the present inventor, what are needed are vacuum condensing boiler designs for use with vapor vacuum heating systems.

Therefore, it would be an advancement in the state of the art to provide vacuum condensing boilers. It is against this background that various embodiments of the present invention were developed.

BRIEF SUMMARY OF THE INVENTION

Accordingly, one embodiment of the present invention is a boiler for boiling water to produce steam, comprising (1) an evaporating section comprising a combustion chamber for burning fuel with air and generating hot flue gas, and an evaporating heat exchanger around the combustion chamber for exchanging heat between the flue gas and water to produce the steam which exits the boiler; and (2) a condensing section comprising a condensing heat exchanger for exchanging heat between the hot flue gas from the combustion chamber and a low-temperature water return having a temperature below approximately 100° F., generating flue gas condensate, which leaves the boiler, wherein the low-temperature water return is heated by the hot flue gas in the condensing heat exchanger before entering the evaporating heat exchanger for additional heating.

Another embodiment of the present invention is the boiler described above, further comprising fins adapted to enhance the exchange of heat between the flue gas and evaporating water.

Another embodiment of the present invention is the boiler described above, wherein the counter-current heat exchanger contains one or more passes.

Another embodiment of the present invention is the boiler described above, wherein the counter-current heat exchanger contains two or more passes.

Another embodiment of the present invention is the boiler described above, wherein the boiler is utilized with a vapor vacuum system.

Another embodiment of the present invention is the boiler described above, further comprising an array of short thick wall heat pipes.

Yet another embodiment of the present invention is the boiler described above, wherein the heat pipes comprise closed-end tubes with a working fluid under vacuum.

Other embodiments of the present invention include methods corresponding to the boilers and systems described above, as well as methods of operation of the boilers and systems described above. Other features, utilities and advantages of the various embodiments of the invention will be apparent from the following more particular description of embodiments of the invention as illustrated in the accompanying drawings, in which like numerals indicate like elements.

DETAILED DESCRIPTION OF THE INVENTION

The following description is merely exemplary in nature and is in no way intended to limit the present disclosure, application, or uses.

Figure 1:
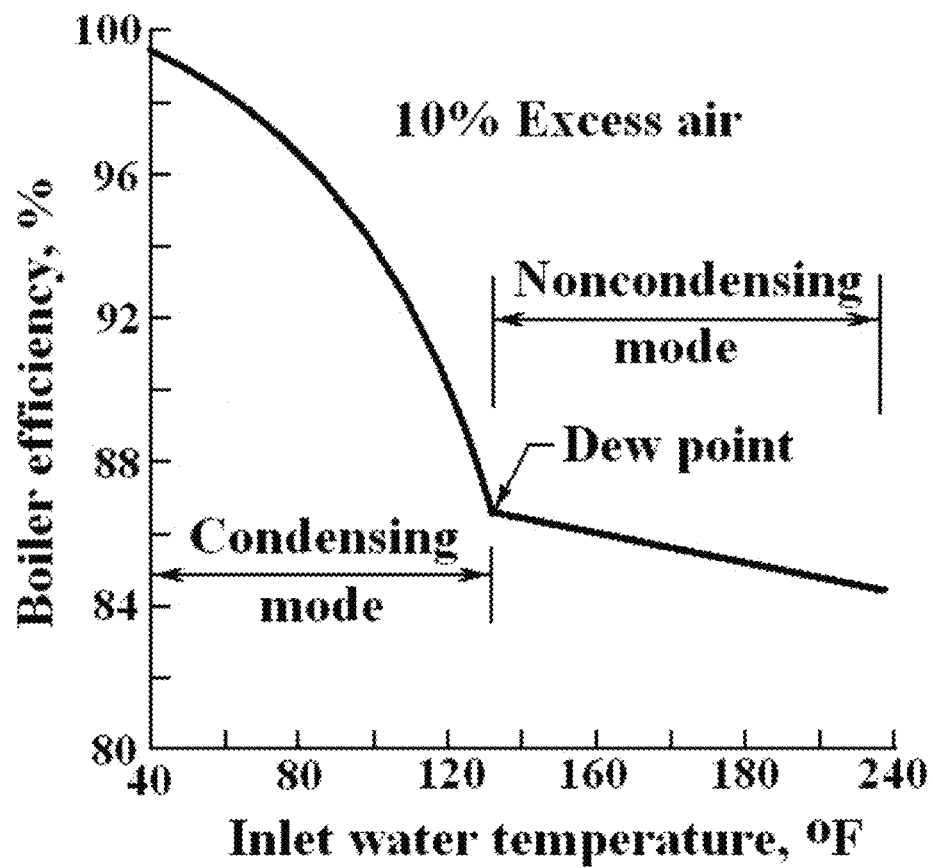
FIG. 1 illustrates a thermal efficiency of a condensing boiler system as a function of return condensate temperature.

In order to boost energy efficiency, modern hot water condensing boilers ("CB") absorb the latent heat of water vapor from the flue gas. Recommended temperature of water return temperature (supply into boiler condensing section) is below 100° F. in order to condense most of the water (see FIG. 1, adapted from T. H. Durkin, "Boiler System Efficiency," ASHRAE Journal, vol. 48, July 2006, p. 51). In reality, water return temperature is at 140° F. level for most of the heating season in order to deliver enough heat into building. As a result, benefits of condensing mode usage are lost. Another problem with hot water condensing boilers is limited temperature of supply water. Typical temperature drop through hot water heating systems is 20° F., and therefore CB supply water temperature is limited to 120-160° F. At such low temperatures, the energy value of delivered heat is less than in regular hot water systems.

The temperature of condensate return in traditional vacuum single-pipe systems is either equal to the temperature of vapor rising through the same pipe, or slightly lower in two pipe systems. The high temperature of condensate return is considered an inherent feature of traditional vacuum and steam systems and is never challenged. The present inventor has recognized that the lowered temperature of condensate return can be used with new and improved vapor vacuum condensing boilers, which would improve system efficiency.

Herein are presented several designs for condensing vacuum boilers that can be utilized with a low temperature vapor vacuum system, as described in related U.S. Pat. No. 8,702,313 entitled "VAPOR VACUUM HEATING SYSTEMS AND INTEGRATION WITH CONDENSING VACUUM BOILERS," issued on Apr. 22, 2014 to the inventor of the present application. Since the various vapor vacuum system embodiments described therein allow integration of condensing boilers for the first time, vacuum condensing boilers are desirable. Accordingly, embodiments of various vacuum condensing boiler designs are described herein. Various condensing boiler designs are envisioned within the scope of the present invention, and the particular condensing boiler designs are not intended to limit the scope of the present invention as one of ordinary skill in the art would envision multiple modifications and combinations of the design concepts illustrated herein.

A vapor vacuum system can be used in any building and/or dwelling as needed. For the purposes of the descriptions herein, the term "building" will be used to represent any home, dwelling, office building, and commercial building, as well as any other type of building as will be appreciated by one skilled in the art. For purposes of this description, "steam" and "vapor" are used interchangeably. "Single-pipe" and "one-pipe" are used interchangeably and refer to systems with a single pipe used for both feeding vapor to the radiators and returning condensate. "Two-pipe" and "double-pipe" are used interchangeably to refer to systems in which a separate pipe is used to return condensate from the pipe used to feed the vapor to the radiators. As used herein, "closed-loop," "closed loop," and "closed system" are used interchangeably to mean an essentially closed vacuum system and piping with essentially air-tight connections and negligible leakage. The term "steam system" shall refer to positive pressure steam systems, usually operating at up to 2 psig, whereas the terms "vapor vacuum system," "vacuum system," "vapor vacuum heating," and "VVH" shall refer to negative pressure steam systems operating with at least 5 inches Hg vacuum.

Figure 2:
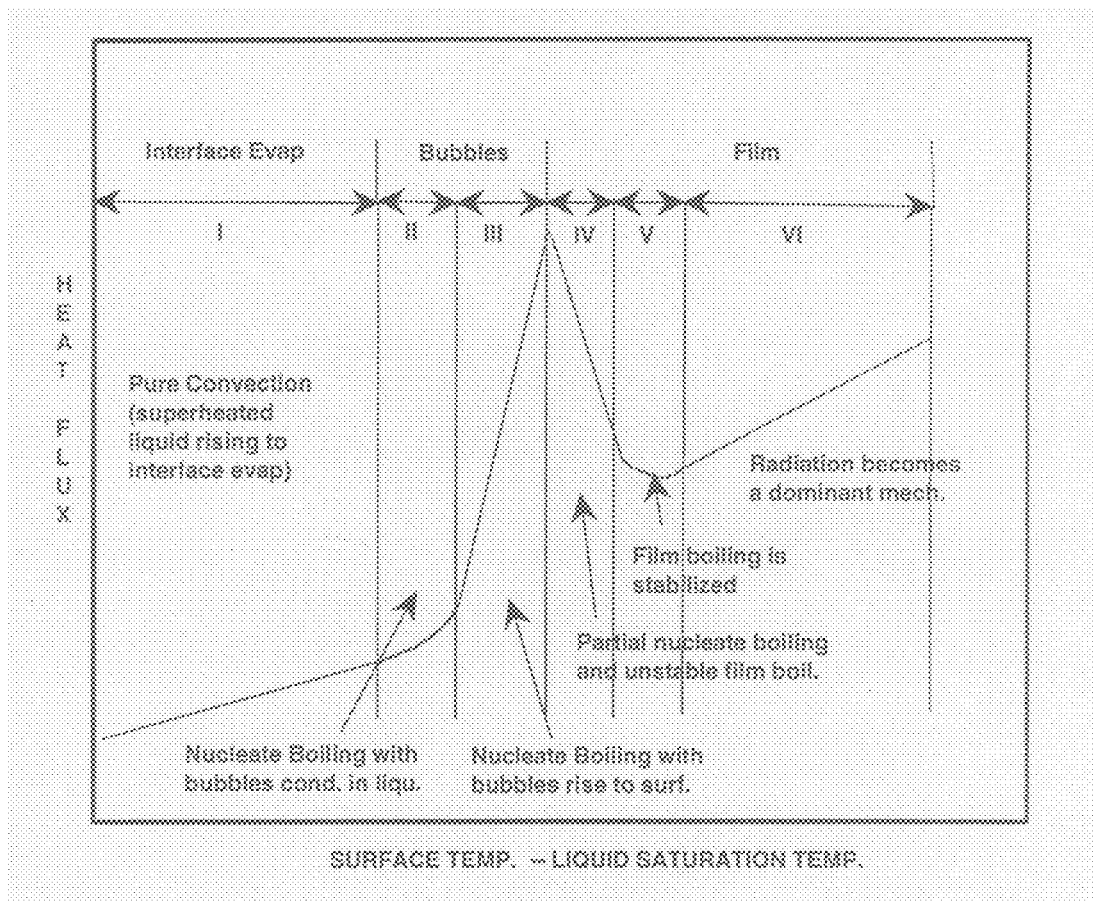
FIG. 2 illustrates a physical interpretation of the Farber-Scorah Boiling Curve.

An attractive feature of the vapor vacuum heating system is advanced heat transfer conditions. Heat transfer coefficients in the boiler are changed by orders of magnitude depending on temperature differences between the wall and boiling temperature of the saturated liquid (see FIG. 2, physical interpretation of the Farber-Scorah Boiling Curve, adapted from FIG. 5.1 in M. L. Corradini, *Fundamentals of Multiphase Flow*, 1997; see also FIG. 6.14 in P. K. Nag, *Heat and Mass Transfer*, 2nd Ed., 2007). Hot water boilers work in the least efficient regime of interface evaporation (pure convection). Furthermore, in hot water systems, the "bubbles" regimes, which have the highest heat transfer coefficients, are avoided because the hot water circulation worsens in the presence of the vapor phase. Conversely, in a vacuum system, heat transfer occurs instantly in the most efficient "bubbles" regime because water boils at lower temperatures. Therefore, the required heat exchange area can be reduced significantly not only in the boiler evaporative section, but also in the boiler condensing section.

Figure 3:
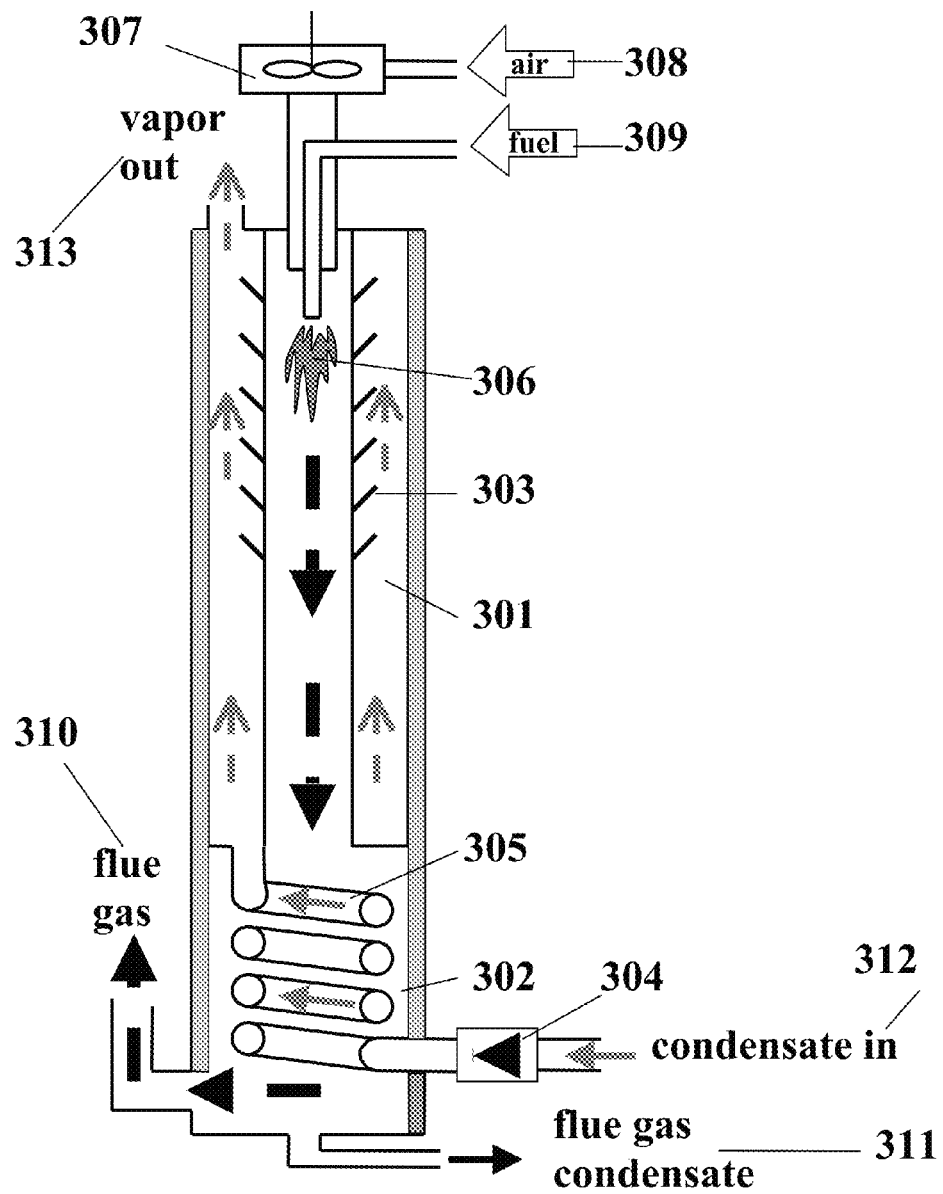
FIG. 3 illustrates a schematic of an embodiment of a vacuum condensing boiler according to one embodiment of the present invention.

FIG. 3 illustrates a schematic of a vacuum condensing steam boiler with a single pass down flow configuration according to one embodiment of the present invention. Two- and three-pass apparatus may be used as well. High temperature flue gas from a burner 306 evaporates water in a boiler cylindrical evaporating section 301 and then flows down into a condensing section 302 along a spiral tube heat exchanger 305 filled with condensate return from the radiators (radiators not shown). Air 308 and fuel 309 are supplied from the boiler top; an air blower 307 is utilized to start the system. Cold condensate 312 from radiators enters into the spiral tube heat exchanger 305 from the bottom of the boiler and rises up due to hot water's lower density, boils, and exits the boiler as vapor phase 313. Condensate 312 from the radiators periodically returns into the boiler through a back flow valve 304 when the boiler stops and the system pressure equalizes. To avoid a sharp decrease in the heat transfer in the evaporating section due to transition into film boiling, fins 303 are provisioned to direct vapor phase outward from the heat exchange area in the evaporating section 301 of the boiler. Flue gas 310 leaves the boiler bottom through an exhaust line, while flue gas condensate 311 is removed from the boiler bottom through a separate line.

Figure 4:
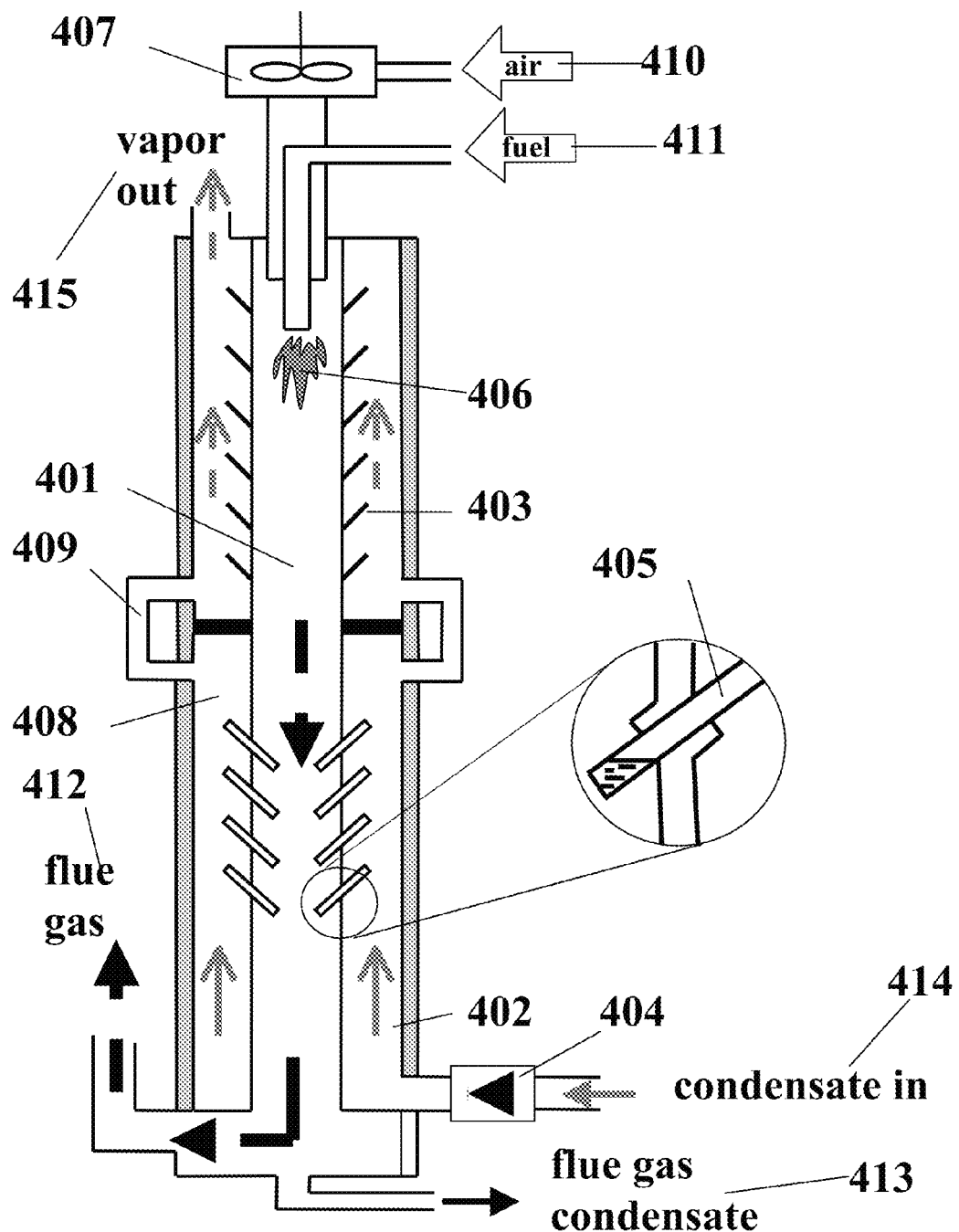
FIG. 4 illustrates a schematic of another embodiment of a vacuum condensing boiler according to another embodiment of the present invention.

In one alternative embodiment of the vacuum condensing boiler, an array of short thick wall heat pipes can be utilized in the condensing section instead of the spiral tube heat exchangers, as shown in FIG. 4. High temperature flue gas from a burner 406 evaporates water in a boiler cylindrical evaporating section 401 and then flows down into a condensing section 402. Heat pipes 405 are threaded through the inner wall of the condensing section 402. These heat pipes have no wick capillary structure; instead, they comprise short, closed-end tubes with a working liquid under vacuum (water can be used as a working liquid in some embodiments). The condensing section 402 comprises two semi-cylinders 408 connected to the evaporating section 401 by lines 409 that can be taken apart for the heat pipes' inspection and replacement. Although the tips of these heat pipes 405 will be exposed to corrosive flue gas, the condensing section 402 would still be functional if the walls of one or several heat pipes fail. Air 410 and fuel 411 are supplied from the boiler top; an air blower 407 is utilized to start the system. Cold condensate 414 from the radiators enters from the bottom of the boiler and rises up due to hot water's lower density, boils, and exits the boiler as vapor phase 415. Condensate from the radiators periodically returns into the boiler through a back flow valve 404 when the boiler stops and the system pressure equalizes. To avoid a sharp decrease in the heat transfer in the evaporating section 401 due to transition into film boiling, fins 403 are provisioned to direct the vapor phase outward from the heat exchange area in the evaporating section of the boiler. Flue gas 412 leaves the boiler bottom through an exhaust line, while flue gas condensate 413 is removed from the boiler bottom through a separate line.

In some embodiments of the present invention, vacuum condensing boilers having multiple passes designs are possible according to the principles of the present invention. Proposed in FIGS. 3 and 4 were designs of vacuum condensing boilers with single-pass flue gas flow. Like hot water condensing boilers, two- and three-flue gas passage designs can be utilized for the purpose of compact design and efficiency. Instead of using a single-pass flow of flue gas from top to bottom as shown in FIG. 3, flue gas flows in multiple passes from top to bottom, and back to the top, as it exchanges heat with the condensate return. Such multiple pass embodiment can increase the efficiency of heat exchange and provide for an even more compact design.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the present invention has been particularly shown and described with reference to embodiments thereof, it will be understood by those skilled in the art that various other changes in the form and details may be made without departing from the spirit and scope of the present invention.

What is claimed is:

1. A boiler for boiling water to produce steam, comprising:
   an evaporating section comprising a combustion chamber for burning fuel with air and generating hot flue gas, and an evaporating heat exchanger around the combustion chamber for exchanging heat between the flue gas and water to produce the steam which exits the boiler; and
   a condensing section comprising a condensing heat exchanger for exchanging heat between the hot flue gas from the combustion chamber and a low-temperature water return having a temperature below approximately 100° F., generating flue gas condensate, which leaves the boiler,
   wherein the low-temperature water return is heated by the hot flue gas in the condensing heat exchanger before entering the evaporating heat exchanger for additional heating, wherein the boiler is utilized with a vapor vacuum system.

2. The boiler of claim 1, further comprising:
   fins adapted to enhance the exchange of heat between the flue gas and evaporating water.

3. The boiler of claim 1, wherein the evaporating heat exchanger contains one or more passes.

4. The boiler of claim 1, wherein the evaporating heat exchanger contains two or more passes.

5. The boiler of claim 1, further comprising:
   an array of short thick wall heat pipes.

6. The boiler of claim 5, wherein the heat pipes comprise closed-end tubes with a working fluid under vacuum.

7. A method for boiling water to produce steam, comprising:
   burning fuel with air and generating hot flue gas in a combustion chamber;
   exchanging heat between the flue gas and water to produce the steam in an evaporating heat exchanger around the combustion chamber; and
   exchanging heat between the hot flue gas from the combustion chamber and a low-temperature water return having a temperature below approximately 100° F., generating flue gas condensate, in a condensing heat exchanger,
   wherein the low-temperature water return is heated by the hot flue gas in the condensing heat exchanger before entering the evaporating heat exchanger for additional heating, wherein a boiler comprising the combustion chamber, evaporating heat exchanger and condensing heat exchanger, is utilized with a vapor vacuum system.

8. The method of claim 7, wherein the evaporating heat exchanger contains one or more passes.

9. The method of claim 7, wherein the evaporating heat exchanger contains two or more passes.

* * * * *